J. H. BOYE.
COMBINATION ORDER CHART AND COMMODITY CABINET.
APPLICATION FILED APR. 5, 1916.
1,276,488. Patented Aug. 20, 1918.
3 SHEETS—SHEET 1.
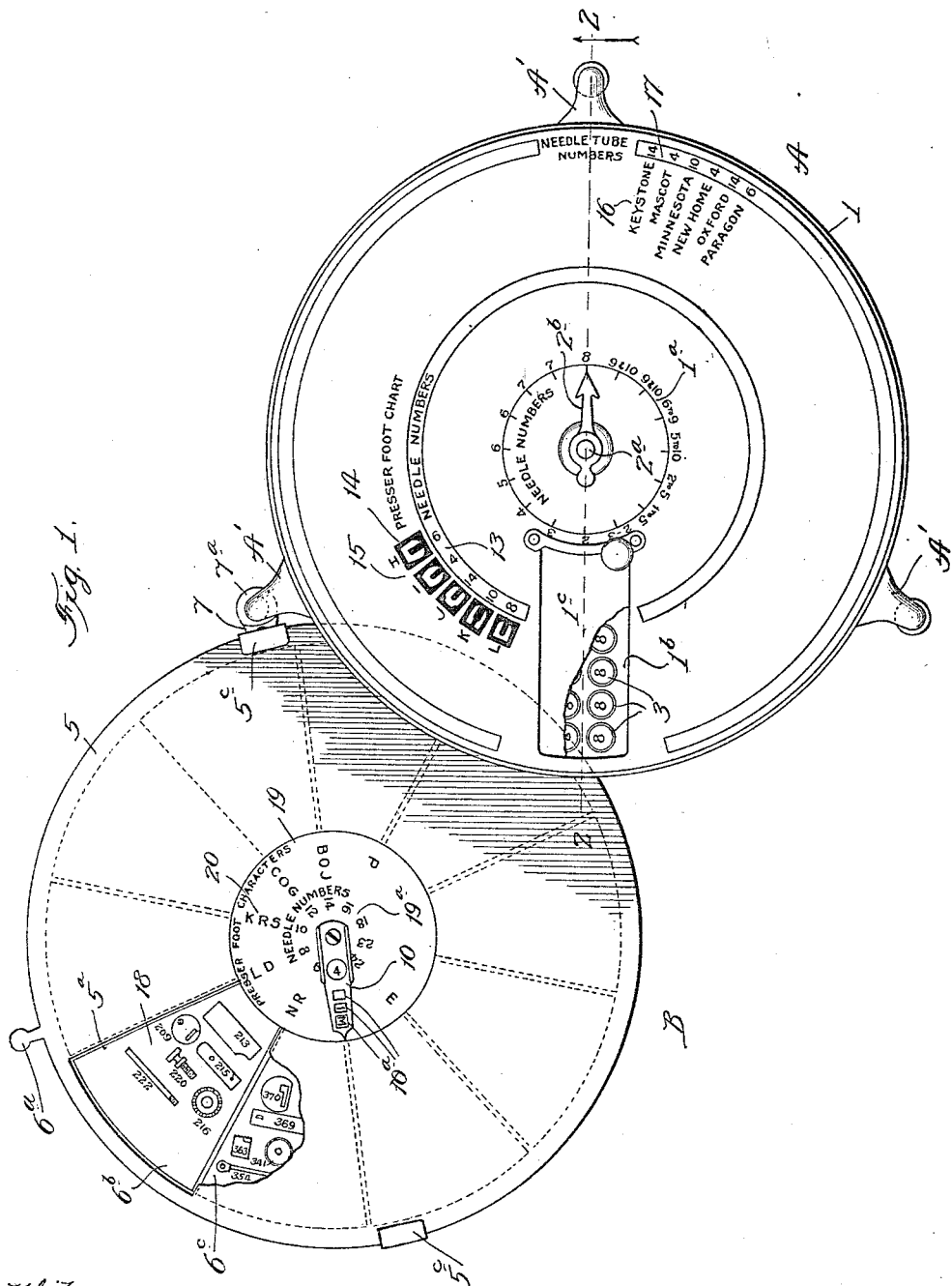
Inventor:
James H. Boye,
By Dyrenforth, Lee, Chritton and Wiles
Attys.

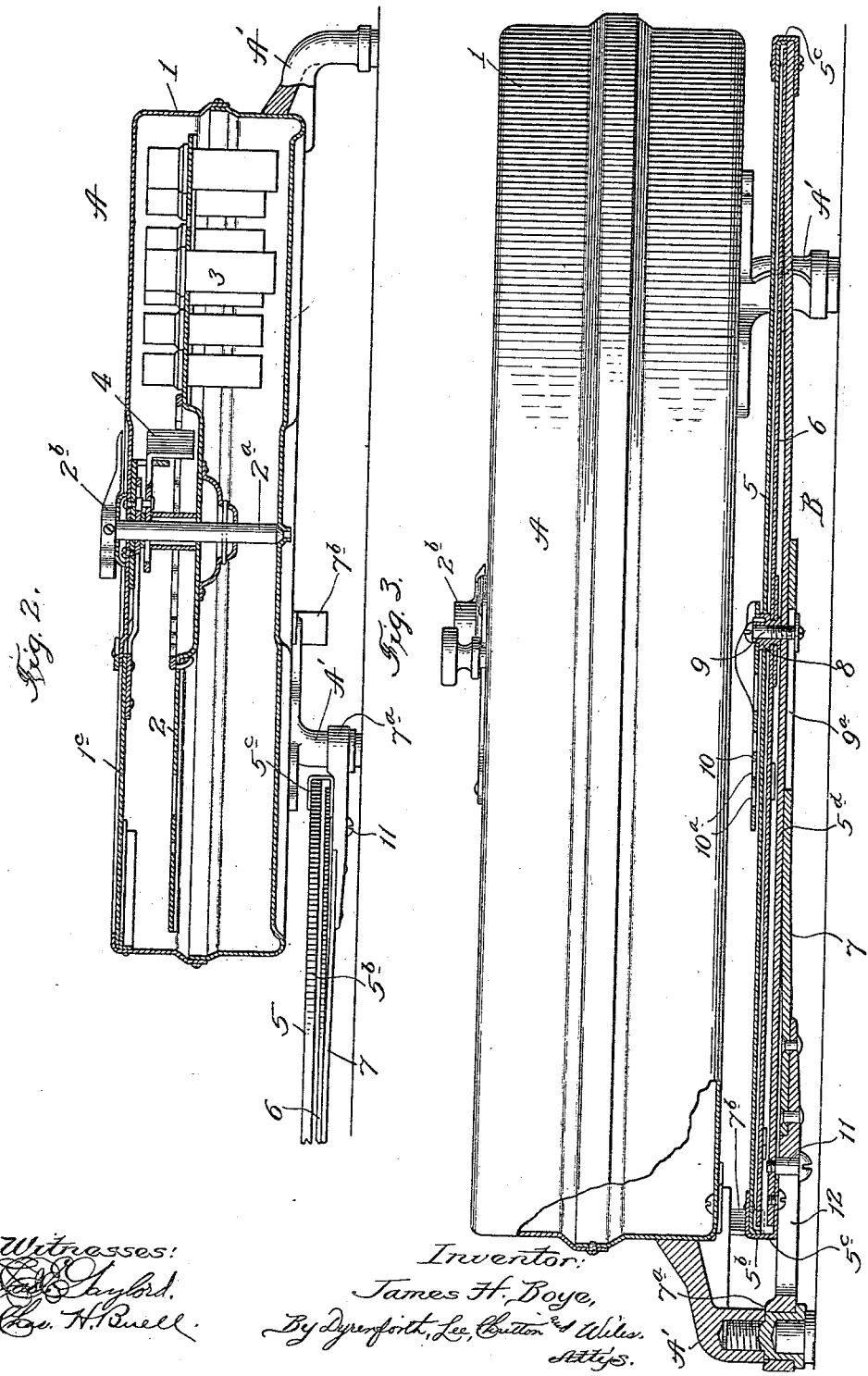

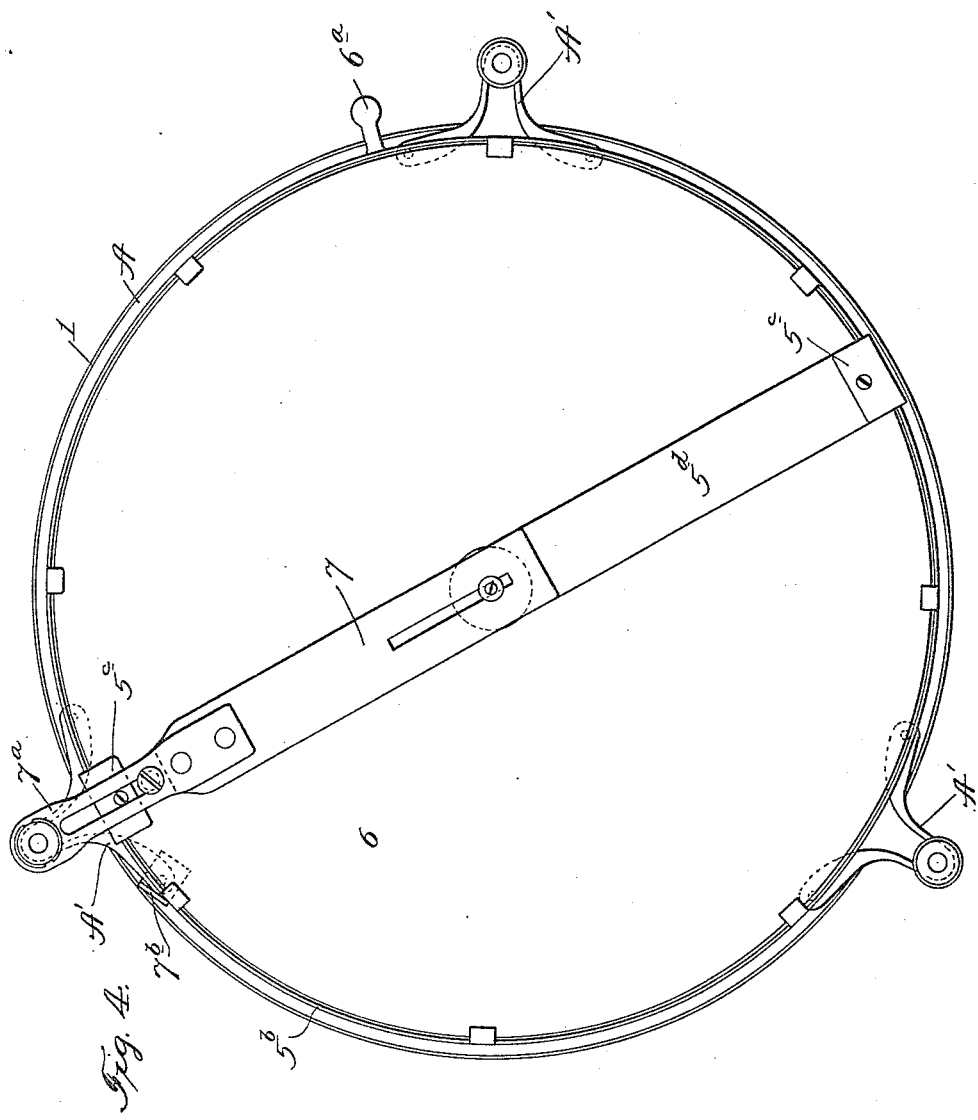

UNITED STATES PATENT OFFICE.

JAMES H. BOYE, OF CHICAGO, ILLINOIS, ASSIGNOR TO THE BOYE NEEDLE COMPANY, OF CHICAGO, ILLINOIS, A CORPORATION OF ILLINOIS.

COMBINATION ORDER-CHART AND COMMODITY-CABINET.

1,276,488.

Specification of Letters Patent. Patented Aug. 20, 1918.

Application filed April 5, 1916. Serial No. 89,233.

*To all whom it may concern:*

Be it known that I, JAMES H. BOYE, a citizen of the United States, residing at Chicago, in the county of Cook and State of Illinois, have invented a new and useful Combination Order-Chart and Commodity-Cabinet, of which the following is a specification.

This invention relates particularly to a combination order-chart and commodity-cabinet. The commodity-cabinet herein shown is of the construction described and claimed in my Patent No. 946,852, granted Jan. 18, 1910.

The primary object of the present invention is to provide a simple and cheap combination commodity-cabinet and order-chart, which will enable small articles or parts to be stored and dispensed with facility, and which will facilitate the ordering of machine parts, or repairs, where it is inconvenient for the dealer to carry the same in stock.

The invention is illustrated in its preferred embodiment in the accompanying drawings in which—

Figure 1 represents a plan view of a combination commodity-cabinet and order chart embodying my invention, the order-chart being shown in the partially exposed or open position, and certain parts being shown brokenly; Fig. 2, a broken vertical sectional view taken as indicated at line 2 of Fig. 1; Fig. 3, a vertical view, showing the order-chart in section and the cabinet casing brokenly in elevation; and Fig. 4, a bottom plan view of the device, showing the order-chart in the position which it occupies when housed beneath the commodity-cabinet.

In the illustration given, A represents a commodity-cabinet provided with feet or legs $A^1$; and B, an order-chart which is normally housed beneath the commodity-cabinet, but which may be withdrawn or extended, at will, to enable the order-chart to be consulted.

The structure of the commodity-cabinet A is practically the same as that disclosed in the above-mentioned patent. The commodity-cabinet comprises a casing 1, and a rotary carrier 2 mounted on a shaft $2^a$ equipped at its upper end with an index pointer $2^b$, which serves also as a means for rotating the shaft $2^a$ and the carrier which is fixed to rotate therewith. The index pointer $2^b$ plays over a dial $1^a$ with which the casing-top is provided. The casing-top is also provided with a hand-opening $1^b$, guarded by a closure $1^c$.

The carrier is provided with sockets adapted to receive flanged tubes or containers 3, which may contain various sizes of needles, for instance. The needle-tubes may be loaded in the carrier 2, on various segments thereof, according to the needle sizes corresponding with the numbering of the dial $1^a$. The carrier may be turned to bring any selected size of needle beneath the hand-opening $1^b$, at will.

A carrier-lock 4, co-acting with the closure $1^c$, is shown, this device being constructed and operated as disclosed in said patent. The device 4 serves to lock the carrier when the closure is thrown to the open position.

The order-chart B comprises a housing-disk 5, provided with a segmental opening $5^a$; and a parts-chart 6 journaled to rotate with relation to the housing-disk 5, and equipped at its edge with a radially projecting thumb-piece or handle $6^a$.

The housing-disk 5 is provided with a down-turned marginal flange $5^b$, which encircles the circumference of the disk 6; and applied to the marginal portion of the disk 5 are U-shaped bracket members $5^c$ to which are firmly secured the ends of a bar $5^d$ which is disposed below the chart disk 6.

The bar $5^d$, which is rigidly secured to the disk 5 through the medium of the bracket members $5^c$, is slidably mounted on an arm 7 which is pivotally connected, as indicated at $7^a$, to one of the legs $A^1$. The parts-chart 6 is firmly secured to a central sleeve 8, journaled on a stud 9, whose lower end slidably engages a slot $9^a$ with which the arm 7 is provided. To the upper end of the sleeve 8 is secured an index pointer 10, by means of which the parts-chart 6 may be rotated with relation to the housing 5. The index pointer 10 is provided with a series of perforations or sight-openings $10^a$. The supporting bar $5^d$ of the housing 5 is also equipped with a guide stud 11, adapted to move in a longitudinal guide-slot 12 with which the arm 7 is provided near its point of pivotal connection with the leg $A^1$.

The top of the cabinet casing 1 is provided with a column or circle of needle numbers 13, containing numerals arbitrarily applied to needles for sewing machines of various makes; and adjacent the circle of needle numbers, the casing top is provided with a presser-foot chart 14 containing the configurations of presser-feet of sewing machines of various makes. Identified with the presser-foot chart 14 is a series of letters or characters 15. The top of the casing 1 is also provided with a list of sewing machine names 16; and associated with the names of the various makes of sewing machines is a column of needle-tube numbers 17, which correspond with the numbers in the circular column 13.

The upper surface of the parts-chart 6 is divided into segments $6^b$, $6^c$, etc. Each segment is provided with illustrations 18 of the parts of a sewing machine of given make, the several segments being thus used for illustrations of the parts of the different makes of sewing machines. Associated with the various figures illustrating the sewing machine parts are corresponding order numbers.

The index pointer 10, which serves as a means for rotating the parts-chart 6, plays over a dial 19 on the upper surface of the housing-disk 5. The dial 19 is provided with a circle of numerals $19^a$, which correspond with the numerals in the columns 13 and 17 on the top of the casing 1; and the dial 19 is further provided with reference letters or characters 20, which are radially arranged, and which correspond with the reference letters in the column 15 associated with the presser-foot chart 14.

When a customer desires to secure parts for a sewing machine, and knows the name of the manufacturer of the machine, the name may be located on the chart 16, and the corresponding needle-tube number may be used in locating the segment of the chart 6 which illustrates the parts of the machine. For instance, in Fig. 1, the numeral 4 corresponds with the name of the Mascot machine; and the index pointer 10 may be turned until the numeral 4 in the dial-column $19^a$ appears beneath the inner sight-opening $10^a$. When this occurs, the illustration of parts for the Mascot machine will appear beneath the segmental opening $5^a$ of the housing 5. When the name of the manufacturer is not known, the presser-foot of the machine may be applied to the presser-foot chart 14, and the corresponding character (in this instance, I) may thus be known, whereupon the index pointer may be turned to bring the letter I beneath one of the sight-openings $10^a$, which will cause the proper illustrations of machine parts to appear beneath the segmental opening $5^a$.

It will be understood that the presser-foot chart 14 and the list of sewing machine names 16 given are partial only, for sake of simplicity.

The commodity-cabinet described enables small articles to be stored and vended with facility, and the association of the order-chart with the cabinet enables parts which cannot be conveniently carried in stock by the dealer to be ordered with facility from the manufacturer.

In the illustration given, the cabinet A is shown provided with three legs $A^1$, which are equidistant from each other and which project some distance beyond the circumference of the cabinet. The order-chart B is adapted to pass between the leg to which it is attached and another leg, in the operation of swinging the order-chart to a position beneath the cabinet. In the position shown in Fig. 1, the order-chart B has not been moved or slid outwardly on the arm 7. In practice, however, the chart may be slid outwardly to fully expose the chart. When the order-chart is swung under the commodity-cabinet, one edge of the order-chart will engage the adjacent leg of the commodity-cabinet, thereby causing the order-chart to slide toward the pivot portion of the arm 7; and after the large diameter of the order-chart has passed the leg of the cabinet, the edge portion of the order-chart a short distance from the pivotal point $7^a$ will engage the stop $7^d$, and thereby cause the order-chart to move away from the pivotal point $7^a$, so that the order chart will be housed in a concentric position beneath the cabinet, as shown in Fig. 3.

The foregoing detailed description has been given for clearness of understanding only and no unnecessary limitation should be understood therefrom, but the appended claims should be construed as broadly as permissible in view of the prior art.

What I regard as new and desire to secure by Letters Patent is:

1. In means of the character set forth, the combination of a commodity-cabinet, and an order-chart normally housed beneath said cabinet and adapted to be withdrawn to an exposed position, said order-chart comprising a housing provided with a segmental opening and with a dial equipped with reference characters, and a rotary parts-chart bearing illustrations of machine parts for different machines on different segments thereof and equipped with an index pointer through the medium of which the parts-chart may be turned, and reference characters on the casing of the commodity-cabinet identified with the reference characters on the dial of the order-chart.

2. In means of the character set forth, the combination of a commodity-cabinet having its top provided with a presser-foot chart and reference characters associated with the illustrations of the various presser-feet, and an order chart normally housed beneath the commodity-cabinet and withdrawable to an exposed position, said order-chart comprising a housing having a segmental opening and having also a dial provided with reference characters corresponding with said first named reference characters, a parts-chart in said housing having segments bearing illustrations of parts of different makes of machines, and an index pointer adapted to move over said dial and to serve as a means for rotating said parts-chart.

3. In means of the character set forth, the combination of a commodity-cabinet provided with legs, and an order-chart carried by an arm pivotally connected with a leg of said cabinet, said order-chart adapted to be housed beneath said cabinet and comprising a housing mounted on said arm and provided with a segmental opening and equipped with a dial, a parts-chart journaled to rotate with relation to said housing and having segments bearing illustrations of parts of different machines, and an index pointer playing over said dial and serving as a means for rotating said parts-chart.

4. In means of the character set forth, the combination of a commodity-cabinet, an arm pivotally connected therewith and adapted to swing to a position beneath the cabinet, and an order-chart slidably mounted on said arm, said order-chart comprising a housing provided with a segmental opening and a disk having sectors bearing illustrations of parts of different machines, said disk being mounted on a central shaft equipped at its upper end with an index pointer, and said housing bearing a dial over which said index pointer plays.

5. In means of the character set forth, the combination of a commodity-cabinet, an arm pivotally supported at a point near the periphery of the casing of said cabinet and adapted to swing beneath the cabinet, and an order-chart comprising a housing slidably mounted on said arm and provided with a segmental opening and with a dial, a parts-chart bearing on different sectors thereof illustrations of parts of different machines, a central shaft carrying said parts-chart and journaled in said housing, and an index pointer attached to the upper end of said shaft and playing over said dial.

JAMES H. BOYE.

Copies of this patent may be obtained for five cents each, by addressing the "Commissioner of Patents, Washington, D. C."